US012005673B2

(12) United States Patent
Draghetti

(10) Patent No.: US 12,005,673 B2
(45) Date of Patent: Jun. 11, 2024

(54) APPARATUS AND METHOD FOR SHAPING TUBULAR ELEMENTS

(71) Applicant: I.M.A. INDUSTRIA MACCHINE AUTOMATICHE S.P.A., Ozzano dell'Emila (IT)

(72) Inventor: Fiorenzo Draghetti, Ozzano dell'Emilia (IT)

(73) Assignee: I.M.A. INDUSTRIA MACCHINE AUTOMATICHE S.P.A., Ozzano dell'Emilia (IT)

(*) Notice: Subject to any disclaimer, the term of this patent is extended or adjusted under 35 U.S.C. 154(b) by 0 days.

(21) Appl. No.: 18/009,396

(22) PCT Filed: Jun. 10, 2021

(86) PCT No.: PCT/IT2021/050180
§ 371 (c)(1),
(2) Date: Dec. 9, 2022

(87) PCT Pub. No.: WO2021/250716
PCT Pub. Date: Dec. 16, 2021

(65) Prior Publication Data

US 2023/0330963 A1 Oct. 19, 2023

(30) Foreign Application Priority Data

Jun. 10, 2020 (IT) ........................ 102020000013831

(51) Int. Cl.
*B31F 1/20* (2006.01)
*B31D 5/00* (2017.01)

(52) U.S. Cl.
CPC ............ *B31D 5/0095* (2013.01); *B31F 1/205* (2013.01)

(58) Field of Classification Search
CPC ......... B31D 5/0095; B31D 5/00; B31F 1/205; B31F 1/20
USPC ......................................... 493/228, 463, 290
See application file for complete search history.

(56) References Cited

U.S. PATENT DOCUMENTS

| | | | | |
|---|---|---|---|---|
| 3,493,998 A * | 2/1970 | Mueller | B29C 53/30 | 425/391 |
| 5,697,786 A * | 12/1997 | Lange-Mickel | B31F 1/205 | 433/96 |
| 9,974,403 B1 | 5/2018 | O'Neill | | |
| 2009/0283608 A1 * | 11/2009 | Crawley | B29C 49/00 | 220/8 |

OTHER PUBLICATIONS

International Search Report and Written Opinion for PCT Patent Application No. PCT/IT2021/050180 dated Sep. 14, 2021, 12 pages.

* cited by examiner

*Primary Examiner* — Jacob A Smith
(74) *Attorney, Agent, or Firm* — McAndrews, Held & Malloy, Ltd.

(57) ABSTRACT

An apparatus and a method for shaping tubular elements (100), preferably made of paper, to make straws. In particular, a flexible shaped portion, defined by a succession of annular ridges and throats, is made on each tubular element (100) by means of internal shaping members (32) and external shaping members (35) mutually cooperating with each other.

18 Claims, 4 Drawing Sheets

APPARATUS AND METHOD FOR SHAPING TUBULAR ELEMENTS

CROSS-REFERENCE TO RELATED APPLICATIONS

The present application is a National Phase Entry of PCT International Application No. PCT/IT2021/050180, which was filed on Jun. 10, 2021, which claims priority to Italian patent application No. 102020000013831, filed Jun. 10, 2020, both of which are hereby incorporated by reference in their entireties.

FIELD OF APPLICATION

The present invention relates to an apparatus and a method for shaping tubular products, or tubular elements, which in the present disclosure are used as synonyms, preferably made of paper, cardboard or other similar materials provided with adequate flexibility to allow the deformation thereof.

In particular, the apparatus and the method according to the present invention are suitable to shape tubular elements from which to obtain straws, for example to be used for drinking a liquid, or semi-liquid. Specifically, the apparatus and the method according to the present invention are able to shape each tubular element, from which to then obtain a straw, to make at least one flexible shaped portion thereon, which allows the straw to be bent in two, to reduce the overall length thereof before packaging, and then, even repeatably, to bend it as desired by the user, without damaging it and maintaining the functionality thereof.

BACKGROUND ART

Plastic or paper straws are known, typically used in the food industry, with the aim of sipping soft drinks or beverages in general from containers, such as glasses, bottles, cardboard packaging, for example in the shape of a parallepiped, also known as “bricks”.

It is also known that some types of straws are of the bending type, having a flexible shaped portion, which allows to bend the straw in two, even repeatably, without damaging it and maintaining the functionality thereof. Typically, such a flexible shaped portion is of the “bellows” type, defined by a succession of annular ridges and throats coaxial to the longitudinal axis of the straw, and formed for example by grooves, indentations, thickness variations, suitable to allow bending.

Such bending straws are often combined, individually, with beverage containers, such as fruit juices, or the like, hermetically sealed, which are normally small, with a capacity around 100-200 ml, and are each provided with a perforable zone to facilitate the insertion of the straw.

Apparatuses and methods for making straws provided with such a flexible shaped portion are, for example, described in U.S. patent documents U.S. Pat. Nos. 2,985,077, 3,493,998, and 5,697,786.

These known solutions provide mechanical deformer members which act on the straw held in rotation to make the aforementioned annular throats in appropriate positions, such that each throat is interposed between two consecutive ridges.

In some known solutions, such as in that described in the aforementioned U.S. Pat. No. 2,985,077, the mechanical deformer members are placed on a member which is rotatable around an axis of rotation parallel to that of the straw being worked, for which the action thereof also brings the straw into rotation while making the throats.

In other known solutions, such as the one described in the aforementioned U.S. Pat. No. 3,493,998, there are shaping spindles configured to insert inside the straws to be deformed.

Such known solutions have several drawbacks, in particular when used to make the flexible shaped portion of straws made of paper. In fact, while plastic materials—by virtue of the intrinsic properties thereof—allow the throats and ridges of the flexible shaped portion to be made with relative ease, this does not apply to paper straws. In fact, due to the intrinsic properties of the material, paper has a mechanical resistance to permanent deformation which is much greater than that of plastic materials, following an elastic-plastic behavior. In other words, the paper is equipped with a significant elastic component which causes the material to tend to assume the original shape thereof again, upon the cessation of the action of the mechanical deformer members.

Furthermore, another drawback of the solutions known in the art is the fact that the mechanical deformer members act on the straw, and contact it to deform it, only for a very short period of time, for example equal to the time which the straw takes to perform a rotation, or some rotations, thereon.

It is evident that in such a limited period of time, the mechanical deformer members are not capable of carrying out a compression/deformation action of the paper such as to make throats and ridges then having a stable and lasting shape over time.

Consequently, a drawback of the known solutions is that the latter do not allow paper straws to be permanently shaped, since the flexible shaped portion could smooth out immediately after the deformation subjected, and thus lose, at least to a significant extent, the previously formed throats and ridges.

Another drawback of the known solutions, always linked to the intrinsic properties of paper, is the fact that they are not able to shape the straws so as to obtain a bellows structure provided with clear and defined bends, to form the throats and ridges. This means that such straws are not easy to bend in the bellows zone and are also uncomfortable to use.

A further disadvantage of some of the apparatuses and methods known in the art is that they allow to make flexible shaped portions which allow to bend a terminal part of the straw, but only with large radii of curvature. Consequently, such solutions prevent bending the straw substantially thereon, i.e., with a bending angle up to 180°, unless a very long flexible shaped portion is provided and therefore not compatible with the practical and industrial needs of the above field of application, for example for small drinking straws, such as straws for small portable beverage containers, for example those of the “brick” type.

Another drawback of some known solutions is that, due to the structural complexity thereof, they require long and laborious set-up and maintenance operations.

A further drawback of some known solutions is the fact that they are not capable of reaching the high productivity values required in industrial fields of consumer goods with low economic unit value, such as straws, which makes the use of such apparatuses and methods known in the art uneconomic.

An object of the present invention is to provide an apparatus, and a method, for shaping tubular products, or tubular elements, preferably made of paper or the like, from which straws are preferably obtained, so as to make at least one flexible shaped portion thereon.

Another object of the present invention is to provide an apparatus, and to develop a method, capable of achieving high or very high productivity, understood as the number of tubular elements shaped in the unit of time, even above one thousand per minute.

Another object of the present invention is to provide an apparatus, and to provide a reliable and effective method, capable of making shaped portions formed by a succession of annular ridges and throats coaxial to a longitudinal axis of the tubular elements, defined substantially by sharp and permanent bends, and having a stable shape which is maintained indefinitely over time.

Another object of the present invention is to provide an apparatus, and to develop a method, which are very flexible and which allow to shape tubular elements having an overall longitudinal length comprised within a very wide range of values, as well as to carry out a format change in a simple and quick manner, which does not require long downtime and laborious interventions of specialized operators.

Another object of the present invention is to provide an apparatus, and to develop a method, which are suitable to be integrated into a more complex, preferably automated machine, capable of carrying out all the necessary workings on the aforementioned tubular elements, for example to transform them into finished straws, as well as to package each of the latter in a corresponding packaging suitable to preserve it hygienically until its use.

The Applicant has studied, tested and realized the present invention to overcome the drawbacks of the prior art and to obtain these and further objects and advantages.

EXPOSURE OF THE INVENTION

The present invention is expressed and characterized in the independent claims. The dependent claims show other features of the present invention or variants of the main solution idea.

In accordance with the aforementioned objects, according to the invention an apparatus is provided for making drinking straws, preferably made of paper, from tubular elements, and making thereon a flexible shaped portion defined by a succession of annular ridges and throats coaxial to a first longitudinal axis of the tubular elements, formed along a segment of predefined length.

Herein and throughout the present description, the terms “ridges” and “throats” refer, respectively, to reliefs and recesses defined for example as grooves, or indentations, or folds, or variations in thickness which allow the flexible shaped portion to be significantly bent to then be able to bend one terminal portion of the tubular elements onto the other, usually longer, portion of the tubular elements themselves.

In the present description, the apparatus and the method according to the present invention will be described with reference to the working of a tubular product configured as a tubular element, which will be referred to below in an exemplary and non-limiting manner. It is understood that the teachings of the present invention disclose an apparatus and a method suitable to also shape other types of tubular products or elements, for working, for which the person skilled in the art is perfectly capable of adapting the teachings of the present invention to the specific case of application.

According to an aspect of the present invention, the apparatus comprises movement means configured to continuously advance the tubular elements, internal shaping means and external shaping means configured to mutually cooperate so as to make the aforementioned shaped portion acting on an external surface and an internal surface of each tubular element, respectively. The internal shaping means comprise a plurality of shaping spindles disposed parallel to each other and individually distanced, and extending along a respective longitudinal axis. Each shaping spindle is configured to be individually inserted inside a respective tubular element and to be moved by the aforementioned movement means along a working path which develops substantially perpendicular to the aforementioned longitudinal axis. It should be noted that the longitudinal axis of each shaping spindle coincides with the aforementioned first longitudinal axis of the respective tubular element, each shaping spindle being configured to be inserted inside a respective tubular element according to a coaxiality relationship.

According to an aspect of the present invention, the external shaping means comprise a first corrugating unit and a second corrugating unit disposed facing each other, comprising a respective first and second plurality of corrugations which define a respective succession of deformation ridges and throats, such corrugating units being mutually mobile with respect to each other to advance the tubular elements in rolling during the shaping of the shaped portion. At least one of the first and the second plurality of corrugations is obtained on a surface which is disposed at least partly along the aforementioned working path during the shaping of the shaped portion. In accordance with a possible embodiment, such a surface has a length, measured in a direction parallel to the working path, equal to at least ten times a distance measured between the first and the second corrugating unit.

It should be noted that the aforementioned distance is a minimum measurable distance between the corrugating units. Since the latter respectively comprise the first and the second plurality of corrugations, such a distance may for example consist of an average value calculated as an average between the maximum distance present between the corresponding throats of the first and second plurality of corrugations, and the minimum distance present between the corresponding ridges of the first and second plurality of corrugations. In the example provided herein, in which the first corrugating unit is shaped like a disk rotating around a first axis of rotation, said surface is a convex-shaped surface, and said minimum distance may be measured, for example, along any radial direction of said disk exiting from such a first axis of rotation.

According to embodiments provided herein, the apparatus comprises support means which support a plurality of gripping members each configured to temporarily hold one of said tubular elements in a working position.

According to embodiments provided herein, the external shaping means are configured to shape each tubular element locally, acting on an external surface of the latter.

According to an aspect of the present invention, the internal shaping means are configured to shape each tubular element locally, acting on an internal surface of the latter, in cooperation with the aforementioned external shaping means.

In accordance with embodiments provided herein, the plurality of shaping spindles is configured to be first selectively inserted inside the tubular elements during the shaping of the flexible shaped portion, and then selectively extracted from such tubular elements once the shaping is completed.

In accordance with embodiments of the present invention, each shaping spindle comprises internal shaping members configured to shape an internal surface of each tubular element, to make the aforementioned flexible shaped portion in cooperation with the external shaping means.

The expression "internal shaping members", here and throughout the present description, is intended to characterize such members according to the function thereof, which is that of shaping the internal surface of the straw, acting from the interior of the latter.

According to embodiments of the present invention, the internal shaping members are shaped like a corrugated portion, having a profile formed by a succession of annular ridges and throats.

According to embodiments of the present invention, the external shaping means comprise at least said first and second plurality of corrugations each defining a succession of ridges and throats, the shape of which is correlated, preferably mating, more preferably offset, to the shape of the profile of the aforementioned internal shaping members of the shaping spindles such that the annular ridges of the internal shaping members are aligned with the throats of the plurality of corrugations of the external shaping means when said shaping spindles are inserted in the tubular elements.

Preferably, the internal shaping members and the plurality of corrugations of the external shaping means have an extension, measured in a direction parallel to a second longitudinal axis of the support means, equal to at least the nominal extension of the aforementioned segment of predefined length on which the annular ridges and throats of the flexible shaped portion of the tubular elements along the first longitudinal axis are made.

According to embodiments, the second corrugating unit is mounted fixed. According to embodiments, the first corrugating unit comprises a member rotating around a first axis of rotation fixed and parallel to said longitudinal axes. The first and the second plurality of corrugations are opposite each other with a passage zone in between for selectively receiving the tubular elements with the aforementioned internal shaping means inside. In other words, the aforementioned distance between the first and the second corrugating unit is such as to define a passage channel configured to be crossed with interference by the tubular elements while they are moved by the shaping spindles placed therein.

According to embodiments, the support means comprise a support member rotating around a fixed drum, coaxially to the second longitudinal axis.

In accordance with embodiments, the gripping members are disposed in sequence one after another, preferably angularly equally distanced, on the periphery of the support member. It should be noted that the gripping members are disposed, with respect to said support member, so as to hold the oriented tubular elements with the first longitudinal axis thereof substantially parallel to the aforementioned second longitudinal axis.

The first corrugating unit comprises the aforementioned rotating member, rotatable around an axis of rotation thereof, i.e., the aforementioned first axis of rotation, disposed parallel to the second longitudinal axis, but offset with respect to the latter, so as to determine an offset rotation of the rotating member with respect to the support member.

In embodiments provided herein, the aforementioned movement means are configured to advance the aforementioned plurality of shaping spindles along a circumference around a second axis of rotation disposed parallel and not coinciding with the aforementioned first axis of rotation.

In embodiments provided herein, the rotating member is configured as a disk having an external diameter which is smaller than the external diameter of the support member, and is disposed in a position such that it is inscribed within the diameter of the latter. It should be noted that, preferably, the disposition and dimensions of the rotating member are such that the first plurality of corrugations is disposed in the proximity of the aforementioned passage zone, so that the tubular elements, crossing such a passage zone or channel, can gradually interact both with the first plurality of corrugations present on the rotating member (i.e., on the first corrugating unit), and with the second plurality of corrugations present on the fixed member (i.e., on the second corrugating unit).

According to embodiments, the second plurality of corrugations is formed on the aforementioned surface, which has a convex shape, faces said first corrugating unit, and is shaped such that the second plurality of corrugations extends along a predefined arc of circumference having a determinate angle at the center.

According to another aspect of the present invention, compression means of the tubular elements are also provided, in particular each mobile in coordination with the gripping members, to compress the flexible shaped portion just formed on the tubular elements, with a determinate compression force, substantially oriented according to a direction parallel to the aforementioned longitudinal axis, thereby pressing the annular ridges and throats of the flexible shaped portion on top of each other.

According to embodiments, the apparatus further comprises a programmable control and command unit configured to control the movement of the gripping members, the internal shaping means, and the compression means in a mutually coordinated manner. If the apparatus is integrated in a machine for working tubular elements, it is evident that the aforementioned programmable control and command unit can be the control unit of the entire machine. Alternatively, if each working unit comprised in the machine is controlled by a respective control and command unit, the aforementioned programmable control and command unit is capable of interfacing with the other control and command units governing the operation of the working units disposed immediately upstream and downstream of the apparatus according to the present invention, to ensure the correct operation of the machine.

In embodiments of the present invention, the apparatus comprises a plurality of control members, configured as closed-ring cam elements, made on a peripheral surface of the fixed drum, to control, by virtue of the rotation of the support member, the movement of the gripping members, the internal shaping means, and the aforementioned compression means.

According to embodiments provided herein, the apparatus comprises adjustment means configured to allow to modify the position of, and possibly to disassemble, at least the fixed member, and—preferably—also the rotating member, to modify the position thereof along the aforementioned second longitudinal axis, and possibly also with respect to the radial direction, approaching/moving away from the support means.

According to another aspect of the present invention, a method is provided for making drinking straws, preferably made of paper, from tubular products or elements, and making thereon at least one flexible shaped portion defined by a succession of annular ridges and throats, substantially coaxial to a first longitudinal axis of the tubular elements, and thereby obtaining a respective straw from each tubular element.

Such method provides to temporarily holding, in a working position, the tubular elements by means of gripping members supported by the support means.

According to another aspect of the present invention, the method comprises:

- a step of continuously advancing, by means of movement means, a plurality of the aforementioned tubular elements,
- a step of inserting, inside each tubular element, a shaping spindle provided with a corrugated portion defining internal shaping means acting on an internal surface of each tubular element and extending along a respective longitudinal axis,
- a step of moving the shaping spindle inserted inside each tubular element along a working path which develops substantially perpendicular to the longitudinal axis,
- a deformation step of the tubular elements in which it is provided to shape the shaped portion by means of external shaping means, acting on an external surface of each tubular element, and cooperating with the internal shaping means.

According to an aspect of the present invention, the aforementioned deformation step provides to advance the tubular elements in rolling by means of the relative movement between a first corrugating unit and a second corrugating unit comprised in the external shaping means. The first corrugating unit and the second corrugating unit are disposed facing each other, and comprise a respective first and second plurality of corrugations, defining a respective succession of ridges and throats of deformation, and in which at least one of the first and the second plurality of corrugations is obtained on a surface contacting the tubular elements during said advancing in rolling.

According to embodiments described herein, in the deformation step, during which inside each tubular element, while the latter is temporarily retained by the gripping members, the internal shaping means configured to locally shape each of the aforementioned tubular elements acting on an internal surface of the latter, cooperating with the external shaping means, acting on a corresponding external surface of the tubular elements, are selectively inserted.

In accordance with embodiments of the method provided herein, during the deformation step the internal shaping means are kept selectively inserted inside the tubular elements during the shaping of the flexible shaped portion, and then selectively extracted from the tubular elements once the shaping is completed.

In accordance with embodiments of the method provided herein, the method provides to carry out the deformation step while the tubular elements cross with interference a passage zone or channel, having dimensions related to the aforementioned distance measured between the first and said second corrugating unit.

In the method according to the present invention, the deformation step of the tubular elements allows to form all the ridges and throats of the flexible shaped portion simultaneously, while the elements cross the aforementioned passage zone or channel.

Embodiments of the method according to the present invention provide, after the deformation step, to extract the internal deformation means from the inside of the respective tubular element, and subsequently to exert a compression action on the tubular elements to carry out a compression step in which it is provided to compress, with a determinate compression force, the flexible shaped portion of the tubular elements, pressing the annular ridges and throats of the flexible shaped portion which have been previously shaped during the deformation step on top of each other.

An advantage of the apparatus and the method according to the present invention is to obtain, effectively, a permanent deformation of each tubular element, suitable to make at least one flexible shaped portion each provided with a succession of annular ridges and throats having a stable shape over time. This is possible by virtue of the peculiar shape and disposition of the external shaping members, cooperating with the internal shaping members, which act on each tubular element while it crosses a passage zone, i.e., for a stretch of path, and consequently an intervention time, long enough for permanent deformations of stable and lasting shape to be made.

Furthermore, by virtue of the presence of the compression groups, advantageously the apparatus and the method according to the present invention allow to reiterate and better define the bends made during the deformation step to form the succession of annular ridges and throats.

Another advantage of the apparatus and the method according to the present invention is to allow to achieve very high productivity, even higher than the thousand shaped straws per minute.

A further advantage of the apparatus and the method according to the present invention is to allow for simple and rapid maintenance operations, also in case of sudden malfunctions, or fine-tuning interventions when the apparatus must be set up to work a different tubular element format. This is possible by virtue of the presence of adjustment and disassembly means which allow to easily adjust the position, and possibly disassemble some components of the apparatus, such as the mobile element and the fixed element having the external shaping members.

The Applicant has studied, tested and realized the present invention to overcome the drawbacks of the prior art and to obtain these and further objects and advantages.

ILLUSTRATION OF THE DRAWINGS

These and other features of the present invention will become clear from the following embodiment description, given as a non-limiting example, with reference to the attached drawings in which.

Figure 6A:
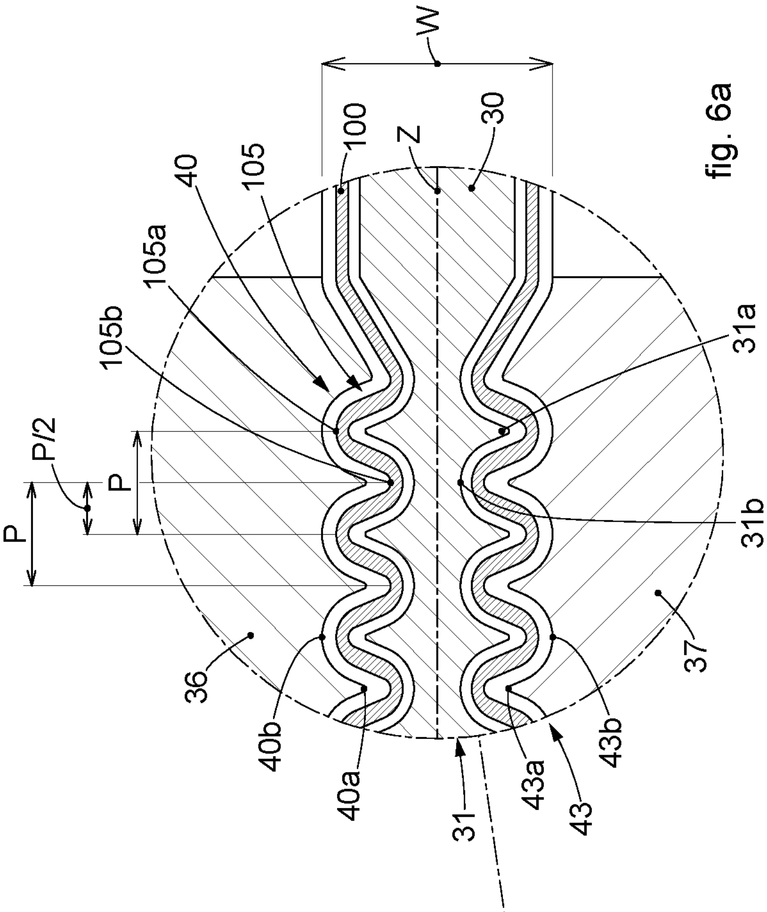
FIG. 6 is a partial, schematic and non-scale section of a detail of the apparatus of FIG. 1, illustrating a working step of the tubular elements.
Figure 6:
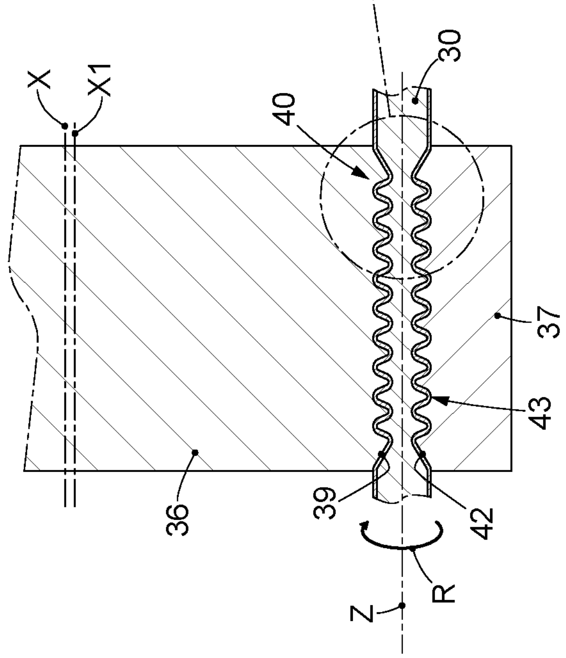

FIG. 6*a* is an enlarged detail of FIG. 6.

To facilitate understanding, identical reference numbers have been used, where possible, to identify identical common elements in the figures. It is to be understood that elements and features of an embodiment can be conveniently incorporated into other embodiments without further clarification.

It should be noted that in the present description and in the claims, the terms vertical, horizontal, lower, upper, right, left, high, low, front and rear, with their variations, have the sole function of better illustrating the present invention with reference to the figures of the drawings and must not be used in any way to limit the scope of the invention itself, or the scope of protection defined by the appended claims. For example, the term vertical is meant to indicate an axis, or a plane, which can be either perpendicular to the horizon line or inclined, even by several degrees, for example up to 20°, with respect to such a perpendicular position.

Furthermore, those skilled in the art will recognize that certain dimensions, or features, in the figures may have been enlarged, deformed, or shown in an unconventional, or non-proportional manner to provide a version of the present invention which is easier to understand. When dimensions and/or values are specified in the following description, the dimensions and/or values are provided for illustrative purposes only and are not to be construed as limiting the scope of protection of the present invention, unless such dimensions and/or values are present in the appended claims.

DESCRIPTION OF AN EMBODIMENT

Reference will now be made in detail to a possible embodiment of the invention, illustrated in the attached figures, which is provided by way of illustration of the invention and is not intended as a limitation thereof. For example, one or more features illustrated or described, as being part of the embodiment described, may be varied or adopted on or in association with other embodiments to produce further embodiments. It is understood that the present invention will be inclusive of such possible modifications and variations.

Before describing the embodiment, it is further clarified that the present description is not limited in its application to the constructional and arrangement details of the components as described in the following description using the attached figures. The present description may provide for other embodiments and be realized or put into practice in various other manners. Furthermore, it is clarified that the phraseology and terminology used herein is for descriptive purposes and should not be considered as limiting.

Figure 1:
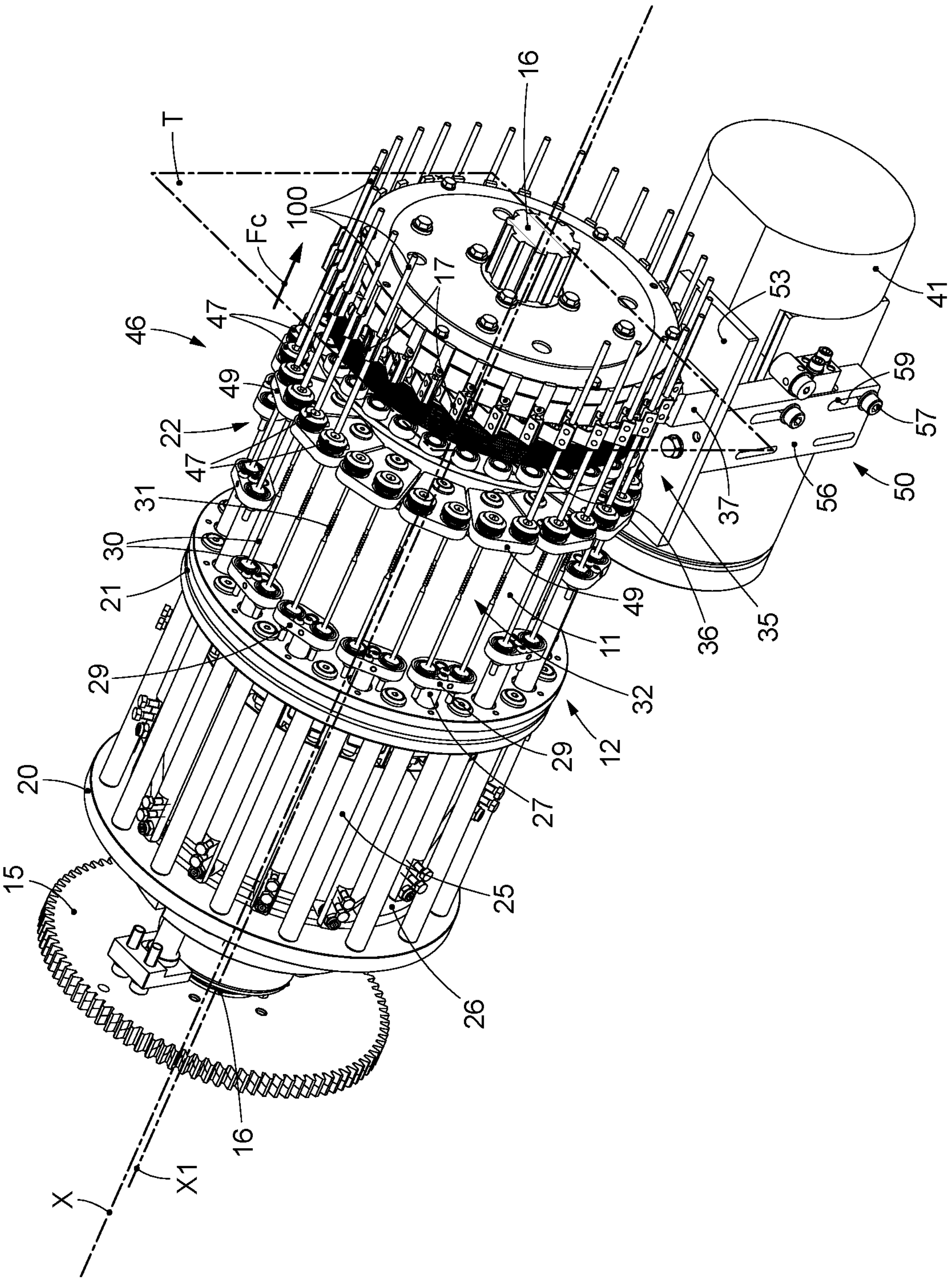
FIG. 1 is a partial and schematic perspective view of an apparatus for shaping tubular elements, according to a possible embodiment in accordance with the teachings of the present invention.
Figure 5:
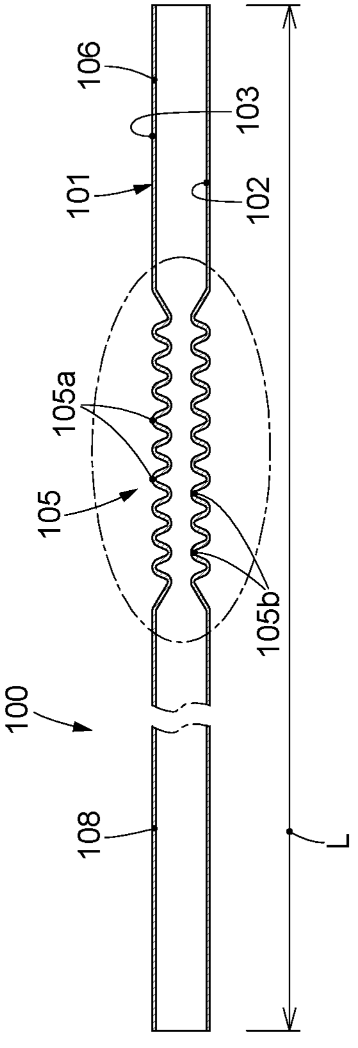
FIG. 5 is a longitudinal sectional view of a tubular paper element, shaped using the apparatus of FIG. 1.

With reference to FIG. 1, an exemplary embodiment is described of an apparatus 10 for shaping tubular elements, or tubular elements 100 (FIG. 5), preferably made of paper material, each having a determinate initial length L preferably comprised between about 50 mm and about 400 mm, from which a corresponding straw is then obtained, by way of non-limiting example.

In order to better understand the inventive concept of the present invention, before describing the apparatus 10 and the relative method in detail, an example of how the shaping can be made on a tubular element 100, using the apparatus 10, is now described, it being understood that the present invention is not limited to such an example, but that the invention can be used for the working of many other types of tubular elements, of a type already known, or which will be developed in the future.

By way of example, the tubular element 100 can consist of a single hollow tubular body of oblong shape and having a longitudinal axis Z, from which a straw 101 can preferably be obtained.

Each tubular element 100 comprises an internal surface 102 and an external surface 103, which define a cylindrical wall having a determinate thickness, for example between about 0.2 mm and about 0.5 mm. Merely by way of indication, the tubular element 100 may have an external diameter comprised between about 2 mm and about 20 mm, preferably between about 2.5 mm and about 5 mm.

Each tubular element 100, at the end of the shaping method carried out with the apparatus 10, will have a flexible shaped portion 105, in the shape of bellows, and two terminal portions 106, 108, the latter being much longer with respect to both the flexible shaped portion 105, and with respect to the other end portion 106. The flexible shaped portion 105 will allow each straw 101 to be easily bent up to about 180°, i.e., until the two terminal portions 106 and 108 thereof become parallel to each other, with a very small radius of curvature.

The aforementioned flexible shaped portion 105 is defined by a succession of ridges **105*a* and throats 105*b*, annular and coaxial with respect to the longitudinal axis Z of the straw 101**, also referred to in the present description as the first longitudinal axis Z.

The apparatus 10 (FIG. 1) comprises a single fixed drum 11, having a longitudinal axis X thereof, or second longitudinal axis X, for example horizontal, and a single support member 12 rotatably mounted around the fixed drum 11, coaxially to the longitudinal axis X. The latter forms the main axis of the apparatus 10.

The support drum 11 is internally hollow and is supported by a fixed structure, not depicted. The mechanical, electrical and electronic components necessary to determine the movement of the support member 12 around the same fixed drum 11, as well as other mobile members and elements, some of which will be described later in detail, can be housed in the internal cavity of the fixed drum 11.

The support member 12, and possibly the other mobile members or elements, define movement means configured to continuously advance the tubular elements 100, by means of the movement of the shaping spindles 30 along a working path, as will be clarified in more detail below.

The support member 12 is rotated, for example, by a first electric motor of a known type, or which will be developed in the future, which for the sake of simplicity is not depicted in the drawings, for example by means of a toothed wheel 15 fixed to a central shaft 16 rotating coaxially with respect to the longitudinal axis X. For example, the support member 12 is rotated in a determinate rotation direction S (FIG. 2), which is counter-clockwise, if viewed from the front part of the apparatus 10, i.e. from the right in FIG. 1.

The support member 12 is provided with a plurality of gripping members 17, i.e., a number of individual gripping members 17 which are angularly distanced from the adjacent one by a first angular pitch. In the example provided herein there are thirty gripping members 17, whereby the first angular pitch is 12°.

Each gripping member 17 is configured to hold a tubular element 100, temporarily and for a defined engagement angle $\alpha$ (FIG. 2) corresponding to a similar rotation angle of the support member 12, positioned with the longitudinal axis Z thereof (FIG. 5) parallel to the longitudinal axis X (FIGS. 1 and 2), during the working thereof in the apparatus 10, as will be described in more detail below.

In particular, each gripping member 17 (FIG. 1) is configured to selectively grasp, or release, a tubular element 100, according to an operating sequence which will be described below, with reference to the operation of the apparatus 10.

It should be noted that the gripping members 17 may be of any known type, or which will be developed in the future, and may be configured, for example, as forceps or jaws, capable of alternately assuming either a closed, or gripping, or an open, or release, condition, in which they respectively grasp and hold in place, or release, a tubular element 100.

For example, the gripping members 17, which rotate together with the support member 12, when it rotates around the longitudinal axis X, can be associated with control means, provided on the fixed drum 11, which can provide for the implementation thereof to selectively and automatically bring them into the open condition thereof, or into the closed condition thereof, in a known manner. The aforementioned control means may be of any known type, or which will be developed in the future, they fall outside the scope of protection of the present invention and therefore, for simplicity of exposure, are not described herein, although later, the opening and closing sequence of the gripping members is described.

The support member 12 comprises three flanges 20, 21 and 22, first, second and third, respectively, all perpendicular to the longitudinal axis X and mechanically connected to each other and to the central shaft 16 to rotate together therewith.

A plurality of actuators, not shown, is slidably mounted between the first flange 20 and the second flange 21, which are angularly distanced from the adjacent one by a second angular pitch. In the example provided herein, there are fifteen actuators, whereby the second angular pitch is 24°.

Each actuator is slidably mounted on a corresponding bar 25 (FIG. 1), fixed in the two flanges 20 and 21 and parallel to the longitudinal axis X. Furthermore, each actuator can slide on the corresponding bar 25, with alternating motion, parallel to the longitudinal axis X, between a first operating position, in which it is near the flange 20, and a second operating position, in which it is near the flange 21, and vice versa, with a complete cycle for each 360° rotation of the support member 12.

The alternating movement of each actuator is achieved by virtue of a cam profile, of known type and not depicted in the drawings, present on a peripheral surface 26 of the fixed drum 11, with which a corresponding cam-follower associated with the corresponding actuator cooperates, whereby each rotation of the support member 12 also determines a corresponding straight and alternating displacement of each actuator between the two operating positions thereof.

To each actuator is fixed the end of a connecting rod 27, parallel to a corresponding bar 25 and slidable in a corresponding through hole of the second flange 21. A block 29 is fixed to the other end of the connecting rod 27, on which two first ends of two appropriately shaped shaping spindles 30 are fixed and configured to be selectively and temporarily inserted inside the tubular elements 100, as will be described in detail below.

All the shaping spindles 30 are parallel to the longitudinal axis X, are angularly distanced from the adjacent one by the aforementioned first angular pitch and are all guided in corresponding through holes of the third flange 22 so as to slide freely therein while remaining parallel to the longitudinal axis X.

Furthermore, each shaping spindle 30 comprises a cylindrical stem 30*a* (FIG. 3), preferably metallic, having an external diameter substantially equal to, or slightly less than, the internal diameter of the tubular elements 100 to be shaped. Each shaping spindle 30 comprises a second end, which is opposite the first end thereof fixed to a block 29 and is configured to cantilever inside a corresponding tubular element 100 held in a position coaxial thereto by a corresponding gripping member 17. There is a corrugated portion 31 on the cylindrical stem 30*a*, i.e., which is shaped so as to define a succession of annular ridges 31*a* (FIGS. 3 and 6*a*) and throats 31*b*, side by side with a linear pitch P (FIG. 6*a*) comprised between a few tenths of a millimeter and a few millimeters, and coaxial to the development axis of the same shaping spindle 30.

Figure 3:
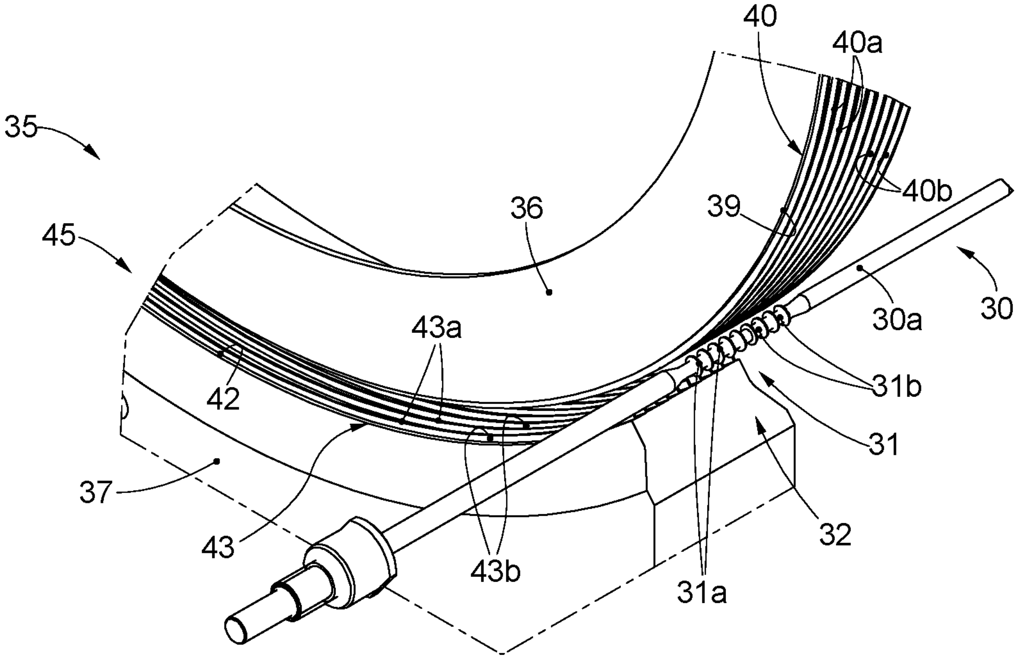
FIG. 3 is an enlarged and schematic perspective view of some components of the apparatus of FIG. 1 in a working step.

In an embodiment, illustrated by way of non-limiting example in FIGS. 3 and 6, the corrugated portion 31 comprises a succession of nine ridges 31*a* and ten throats 31*b*, disposed in sequence one after the other according to a disposition whereby a ridge 31*a* and a throat 31*b* alternate in succession one after the other.

The various shaping spindles 30, which in the example provided herein are thirty, together with the corrugated portions 31 thereof, define the internal shaping means 32 of the tubular elements 100.

Furthermore, the various shaping spindles 30, being associated with the actuators 23, follow the axial movement thereof, whereby they are also configured to move axially, with alternating motion, parallel to the longitudinal axis X, between a first operating position, in which they are outside the tubular elements 100, and a second operating position, in which they are inside the tubular elements 100, and vice versa, with a complete cycle for each 360° rotation of the support member 12.

Figure 4:
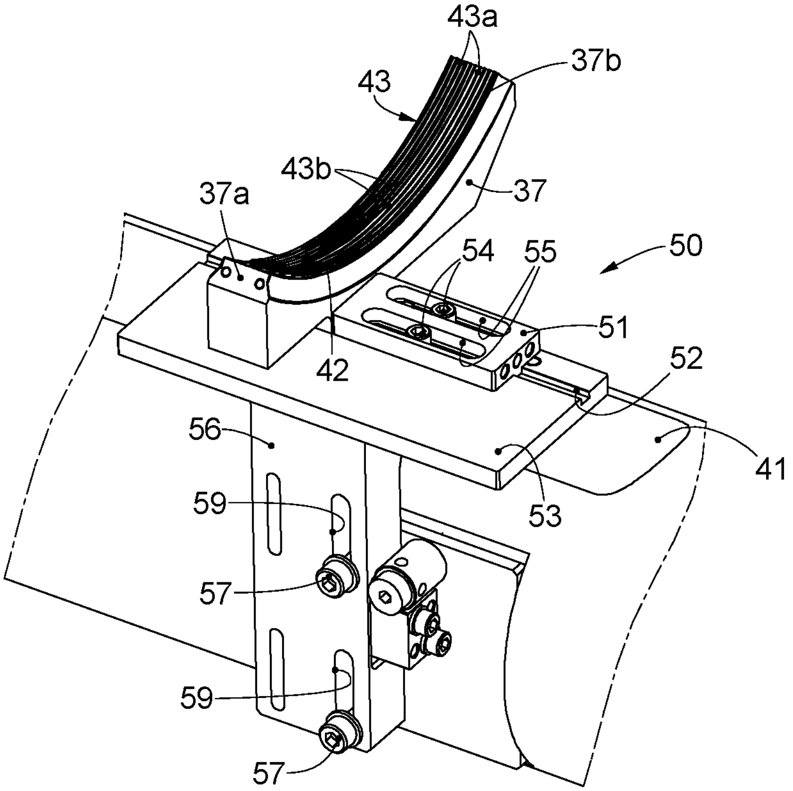
FIG. 4 is a partial and schematic perspective view of some adjustment components of the apparatus of FIG. 1.

The apparatus 10 further comprises external shaping means 35 (FIGS. 1 and 4), configured to cooperate with the internal shaping means 32 to make the flexible shaped portions 105 (FIG. 5) on the tubular element 100, as will be described in detail later.

The external shaping means 35 (FIGS. 1-3) comprise a first corrugating unit, formed by way of example by a disk 36, rotating on a transverse plane T (FIG. 1), perpendicular to the longitudinal axis X, and a second corrugating unit, shaped like a fixed element 37, which acts as a contrast member, disposed on the same transverse plane T on which the disk 36 lies, and configured to cooperate with the latter and with the shaping spindles 30 to make the flexible shaped portions 105 (FIG. 5) on the tubular elements 100, as will be described in more detail below.

The transverse plane T (FIG. 1) is interposed between the gripping members 17 and the third flange 22.

In particular, the disk 36 is rotatable around an axis of rotation X1 thereof, or third longitudinal axis, which is parallel to the longitudinal axis X, but distant from the latter by a determinate value D (FIG. 2), for example by a few millimeters, preferably from about 1 mm to about 5 mm, in the direction of the fixed element 37.

Furthermore, the diameter of the disk 36 is such that the latter completely interferes with the tubular elements 100, brought into rotation by the support member 12, when the same tubular elements 100 are at the lowest point of the rotation thereof, i.e., when they are located on the bottom of a median axis Y, perpendicular to the longitudinal axis X and therefore, in the example provided herein, disposed in a vertical position.

The width of the disk 36 (FIG. 6) is substantially equal to the length of each flexible shaped portion 105 (FIG. 5) to be made on the tubular element 100, measured parallel to the longitudinal axis Z of the latter.

Furthermore, the disk 36 has a peripheral surface 39 (FIGS. 2, 3 and 6) which is shaped so as to have a plurality of corrugations 40, which successively comprises ridges 40*a* and throats 40*b* (FIGS. 3 and 6*a*), which have the same linear pitch P (FIG. 6*a*) as the ridges 31*a* and throats 31*b* of the corrugated portion 31 of each shaping spindle 30. In the example provided herein, the peripheral surface 39 has ten ridges 40*a* and nine throats 40*b*.

It should be noted that, when each shaping spindle 30 is in the second operating position thereof, i.e., inside one of the tubular elements 100 (FIGS. 6 and 6*a*), the ridges 31*a* and throats 31*b* thereof are offset by half of the linear pitch P (FIG. 6*a*), i.e., by P/2 with respect to the ridges 40*a* and throats 40*b* of the disk 36.

The rotation of the disk 36 occurs in the same rotation direction S (FIG. 2) as the support member 12 and is controlled, for example, by a second electric motor, also of a known type, or which will be developed in the future, which for the sake of simplicity is not depicted in the drawings, but which could be housed, for example, in a part 41 (FIG. 1) of the fixed structure and could be connected to the disk 36 by means of transmission members not depicted in the drawings and inserted in the fixed drum 11, which is internally hollow. For this purpose, the disk 36 could be provided with a central through hole 38 (FIG. 2) within which the central shaft 16, coaxial to the longitudinal axis X, can be housed with wide clearance.

The fixed element 37 is adjustably mounted on the part 41 (FIG. 1) of the fixed structure, as will be described in more detail below, and comprises a surface 42 (FIGS. 2, 3, 4 and 6) which has the shape of a cylindrical sector facing the support member 12 and coaxial to the longitudinal axis X. The surface 42 has an angular extension of a defined angle β (FIG. 2), for example comprised between about 45° and about 120°, the bisector of which preferably lies on the median axis Y.

Furthermore, the surface 42 is shaped so as to have a plurality of corrugations 43 (FIGS. 3, 4, 6 and 6*a*) which successively comprise ridges 43*a* and throats 43*b*, which have the same linear pitch P (FIG. 6*a*) as the ridges 40*a* and throats 40*b* of the disk 36 and are exactly aligned therewith. Therefore, in the example provided herein, the surface 42 (FIG. 6) has ten ridges 43*a* and nine throats 43*b*.

Furthermore, the fixed element 37 is positioned at a distance from the longitudinal axis X (FIG. 2) and therefore from the rotating support member 12, measured in a radial direction, along the median axis Y, such as to define, between the corrugations 40 of the disk 36 and the corrugations 43 of the fixed element 37, a passage zone 45, or gap, for the tubular elements 100, which has a width, in a radial sense, which is not constant. In fact, the radial width of this passage zone 45, which is adjustable by an operator, ranges from a maximum value, in correspondence with the side ends 37*a* and 37*b* of the fixed element 37 (FIG. 2), to a minimum value, in correspondence with the median axis Y, and varies as a function of the distance D between the axes X and X1, which is adjustable.

The passage zone 45 allows the tubular elements 100 being worked, which are rotated around the longitudinal axis X by the support member 12, to gradually engage with the external shaping means 35, i.e., with the corrugations 40 of the rotating disk 36 and the corrugations 43 of the fixed element 37, in an increasing and continuous manner for the first half of the angular width p, and then release in a decreasing and continuous manner in the second half of the angular width p. Furthermore, such engagement with the external shaping means 35 occurs while the internal shaping means 32, i.e., the shaping spindles 30, are inserted in the same tubular elements 100.

In accordance with embodiments, not illustrated herein but easily understood by a person skilled in the art and in any case included within the scope of the present invention, it is evident that the external shaping members 35 may comprise only the fixed element 37, or only the rotating disk 36.

The apparatus 10 also comprises compression means 46 (FIG. 1), which are mounted on the support member 12 to rotate together therewith and positioned between the third flange 22 and the transverse plane T.

The compression means 46 are configured to selectively compress the tubular elements 100 toward the corresponding gripping members 17, after the flexible shaped portions 105 have already been formed on the same tubular elements 100.

The compression means 46 comprise a plurality of thrust elements 47 mounted in pairs on actuators 49 mobile alternately along a direction parallel to the longitudinal axis X between a resting position, in which they are close to the third flange 22 (i.e., the position depicted in FIG. 1) and the thrust elements 47 do not interact with the tubular elements 100, and an operating position, in which the thrust elements 47 are in contact with a corresponding tubular element 100 and compress it with a determinate compression force Fc toward the corresponding gripping member 17, and vice versa. In the aforementioned operating position, the thrust elements 47 compress the corresponding flexible shaped portion 105 (FIG. 5) just formed and give it the shape of a bellows, thus favoring the maintenance of the acquired shape.

The alternating axial movement of the compression means 46 (FIG. 1) is achieved by virtue of a cam-shaped profile, of a known type and not depicted in the drawings, present on the peripheral surface 26 of the fixed drum 11, with which corresponding cam-shaped elements associated with the actuators 49 cooperate, whereby each rotation of the support member 12 also determines a corresponding straight and alternating displacement of each actuator 49 between the two resting and operating positions thereof.

The apparatus 10 also comprises adjustment means 50, configured to allow an operator to change the relative position of the fixed element 37 with respect to the rotating disk 36, as well as to disassemble, if necessary, some components of the apparatus 10, such as the same fixed element 37 and the disk 36.

In the example provided herein, the adjustment means 50 are mounted on the part 41 of the fixed structure and allow to change the position of the aforementioned components both along the longitudinal axis X, and with respect to the radial direction, approaching/away from the support member 12.

For example, the adjustment means 50 (FIGS. 1 and 4) comprise at least a first slider 51 sliding linearly in a corresponding guide 52 (FIG. 4) parallel to the longitudinal axis X obtained on a plate 53, by virtue of a coupling comprising a pair of fixed pins 54 inserted in corresponding slots 55 of the first slider 51, also parallel to the longitudinal axis X. The length of the slots 55 determines the maximum stroke allowed by the adjustment means 50 along the longitudinal axis X.

The adjustment means 50 (FIGS. 1 and 4) further comprise at least one second slider 56 fixed to the plate 53 and slidable together therewith in a direction parallel to the median axis Y, by virtue of a coupling which comprises a pair of pins 57 associated with the plate 53 and inserted in corresponding slots 59 of the second slider 56, also parallel to the median axis Y. The length of the slots 59 determines the maximum stroke allowed by the adjustment means 50, along the median axis Y, i.e., perpendicular to the longitudinal axis X.

It is thus possible, during the fine-tuning or maintenance step of the apparatus 10, to adjust the position of the external shaping means 35 in the two directions, i.e., parallel to the longitudinal axis X and parallel to the median axis Y, perpendicular to each other.

The adjustment of the position along the longitudinal axis X allows to carry out a quick and simple fine-tuning of the apparatus 10 whenever tubular elements 100 of different format must be machined. In fact, it is evident that when a batch of tubular elements 100 of different nominal length L (FIG. 5) than the nominal length L of the batch of tubular elements 100 produced previously is to be shaped, the flexible shaped portion 105 thereof can be placed in different relative positions with respect to the transverse plane T (FIG. 1) and therefore the apparatus 10 must be set for working the new batch so as to place at least the external shaping members 35 in the correct position in which it will be provided to make the flexible shaped portion 105.

The movement in radial direction, along the median axis Y (FIG. 2), of approach/distance with respect to the longitudinal axis X and therefore to the support member 12, allowed by the adjustment means 50, allows, on the other hand, to adjust the mutual position between the rotating disk 36 and the fixed element 37, for example when the external diameter of the tubular elements 100 to be worked varies, as well as to access some internal components of the apparatus 10, for example after disassembling the fixed element 37, which is particularly useful when ordinary, or extraordinary, maintenance operations must be carried out to restore the operation of the apparatus 10.

Figure 2:
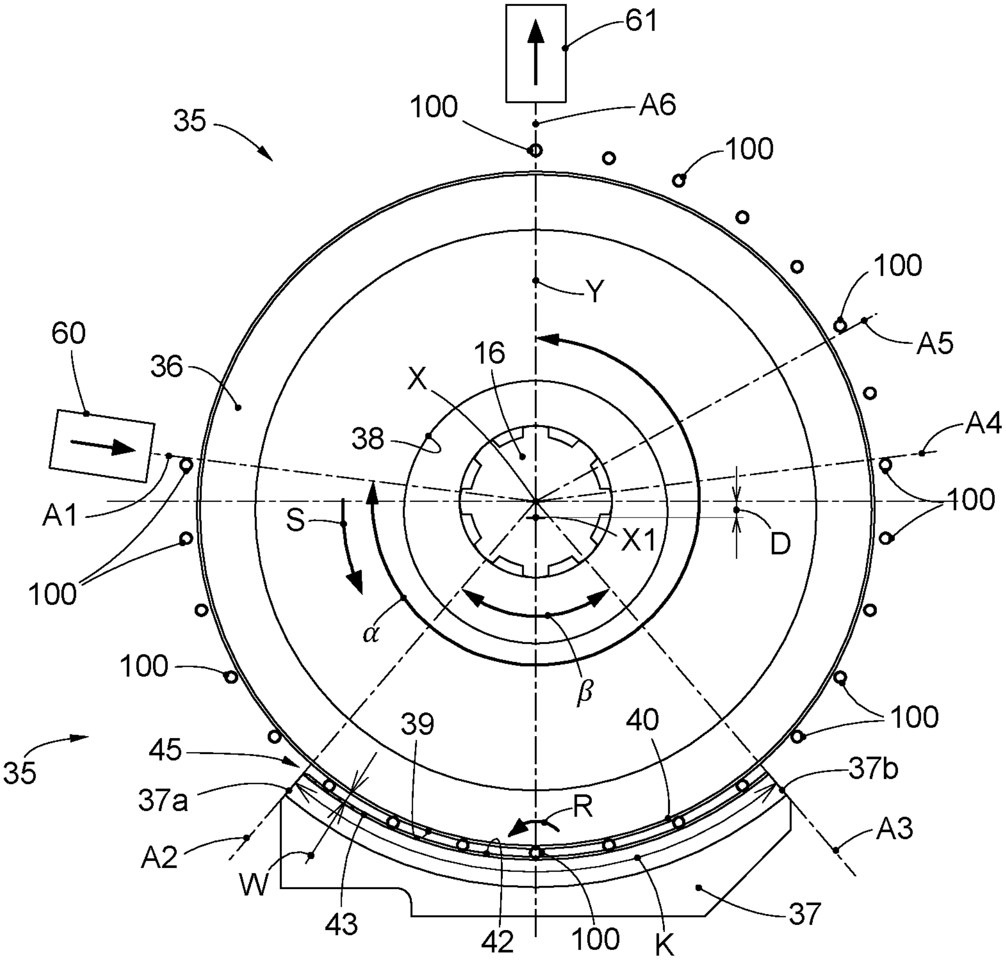
FIG. 2 is a schematic front view of a central part of the apparatus of FIG. 1, showing the eccentricity of a component with respect to the longitudinal axis of the same apparatus, and in which the position of some tubular elements in working is also visible.

According to an embodiment, illustrated in FIG. 2, the apparatus 10 is configured to be associated, for example, with a feed device 60 of tubular elements 100, which may be of any known type, or which will be developed in the future.

In the example provided herein, the feed device 60 is positioned with respect to the apparatus 10 such that each tubular element 100 is picked up by a respective gripping member 17 when it is in an initial radial position A1, which is also the position in which the engagement angle at of the support member 12, rotating in the rotation direction S, begins with each tubular element 100.

It is also provided that, for example, the apparatus 10 is associated with a picking device 61 of the tubular elements 100 already worked, which may be of any known type, or which will be developed in the future, and which is configured to pick up each tubular element 100 from the gripping members 17, once the shaping thereof has been completed, i.e., when each tubular element 100 is in a final radial position A6, for example after a rotation of about 280° from the initial angular supply position A1, which corresponds to the width of the engagement angle α of each tubular element 100 with the support member 12 rotating in the rotation direction S.

The operation of the apparatus 10 described heretofore is now described, which corresponds to the method for shaping tubular elements, i.e., tubular elements 100, preferably made of paper, from which straws 101 are preferably obtained in accordance with the present invention.

The apparatus 10 (FIG. 1) is started by controlling the two electric motors which rotate both the support member 12 around the axis of rotation thereof, consisting of the longitudinal axis X, and the disk 36, which rotates around the axis of rotation X1 thereof.

The apparatus 10 then begins to receive the tubular elements 100 in correspondence with the initial angular supply position A1, in which the feed device 60 (FIG. 2) supplies the tubular elements 100, one at a time, to the gripping members 17 (FIG. 1), which are rotating together with the support member 12 with respect to the support drum 11, in the rotation direction S (FIG. 2). It should be noted that in such an initial angular supply position A1, the gripping members 17 appear, one after the other, in the open condition thereof, ready to accommodate a respective tubular element 100, to move into the closed gripping condition of the same tubular element 100, after the latter has been taken over by the respective gripping member 17.

In such an initial angular supply position A1, the shaping spindles 30 (FIG. 1) are in the first operating position thereof, i.e., completely retracted toward the second flange 21.

Continuing the rotation of the support member 12, the gripping members 17, which each carry a respective tubular element 100, arrive at an angular deformation start position A2 (FIG. 2), in correspondence with which the tubular elements 100 enter the passage zone 45. In this angular deformation start position A2 the corresponding shaping spindles 30 (FIG. 1) have been brought into the second operating position thereof and have therefore entered inside the respective tubular elements 100, being coaxial thereto.

Subsequently, the gripping members 17 continue in the movement thereof until they reach, after a further rotation corresponding to the angle β (FIG. 2), an angular deformation end position A3, in correspondence with which the tubular elements 100 exit the passage zone 45. During the crossing of the passage zone 45, the tubular elements 100 are placed in rolling about the longitudinal axis Z thereof, in a rotation direction R, opposite the rotation direction S of the disk 36, by virtue of the rotation of the latter and the opposite resistance from the underlying fixed element 37. Such rolling of the tubular elements 100 is determined, in particular, both by the interaction of the disk 36 with the fixed element 37, and by the misaligned disposition of the first with respect to the second, which allows the corrugations 40 of the disk 36 to reach in proximity of the corrugations 43 of the fixed element 37.

During the crossing of the passage zone 45, the tubular elements 100 interact with both the corrugations 43 of which the fixed element 37 is provided, and with the corrugations 40 of which the disk 36 is provided, as better seen in FIGS. 6 and 6*a*. The ridges 40*a* and 43*a*, and the throats 40*b* and 43*b* of the corrugations 40 and 43 then interact with the ridges 31*a* and the throats 31*b* of the corrugated portion 31 of the shaping spindle 30 to shape the ridges 105*a* and the throats 105*b* of the flexible shaped portion 105.

It should be noted that the rolling of each tubular element 100 around the longitudinal axis Z thereof allows to accentuate the deformation action which the internal and external shaping members exert on the same tubular elements 100.

When the gripping members 17 reach the angular deformation end position A3 (FIG. 2), the flexible shaped portion 105 of the tubular elements 100 (FIG. 5) has been made. From this angular deformation end position A3 (FIG. 2) the shaping spindles 30 gradually start to retract to return from the second operating position thereof to the first operating position thereof.

Continuing the rotation of the support member 12, the gripping members 17 reach an angular compression start position A4 (FIG. 2), in which the shaping spindles 30 are already disposed in the first operating position thereof, i.e., completely outside the tubular elements 100 and, subsequently, an angular compression end position A5.

Between such angular positions of the support member 12, of compression start and end A4 and A5, the compression means 46 perform a complete compression sequence of the tubular elements 100 by means of an axial movement thereof. Such a movement allows the thrust elements 47 to move from the resting position thereof, in which they are near the third flange 22, in correspondence with the angular position of the support member 12 at compression start A4, to the operating position thereof, in which they are moved towards the gripping members 17, and—finally—back to the resting position thereof, when the support member 12 has reached the angular compression end position A5. By virtue of this movement, which brings the compression means 46 into the operating position, a compression action can be exerted on the tubular elements 100 to compress, with the compression force Fc (FIG. 1), the previously formed flexible shaped portion 105, so as to press the annular ridges 105*a* and the throats 105*b* on top of each other and permanently stabilize the shape thereof. This can be obtained by virtue of the fact that this compression action allows the material, for example paper, to be subjected to a compression stress higher than the yield stress thereof.

Subsequently, continuing the rotation of the support member 12 (FIG. 2), the gripping members 17 reach an angular delivery position A6, in which they are brought into the open position thereof and allow the delivery of the tubular elements 100, one after the other, to the picking device 61.

Continuing the rotation of the support member 12, the gripping members 17 again reach the initial angular supply position A1, in which they receive another tubular element 100, and are ready to repeat the previously described working cycle.

It is evident that at the end of the working cycle, due to the deformation imprinted on the tubular elements 100, which has allowed to make the flexible shaped portion 105, each of the tubular elements 100 has a lower length L than the initial length thereof. Similarly, such a deformation can determine a localized increase in the nominal external diameter of the straws, in particular in correspondence with the flexible shaped portion 105, whose ridges 105*a* may have a maximum extension, in the radial direction, corresponding to a larger diameter than said nominal diameter.

It is clear that modifications and/or additions of parts or steps may be made to the apparatus and/or to the method described so far, without departing from the scope of the present invention.

It is also clear that, although the present invention has been described with reference to some specific examples, a person skilled in the art will certainly be able to make many other equivalent forms of apparatuses and methods having the features expressed in the claims and therefore all of which falling within the scope of protection defined thereby.

In the following claims, the reference numbers and symbols in parentheses have the sole purpose of facilitating the reading thereof and must not be considered as limiting factors as regards the scope of protection defined thereby.

The invention claimed is:

1. Apparatus for making, starting from tubular elements, drinking straws with a shaped portion formed by a plurality of annular ridges alternating with annular throats made along a segment of predefined length, said apparatus comprising movement means configured to continuously advance said tubular elements, internal shaping means and external shaping means configured to mutually cooperate so as to make said shaped portion acting respectively on an external surface and on an internal surface of each tubular element, said internal shaping means comprising a plurality of shaping spindles disposed parallel to each other and individually distanced and extending along a respective longitudinal axis, each shaping spindle being configured to be individually inserted inside a respective tubular element and to be moved by said movement means along a working path which develops substantially perpendicular to said longitudinal axis; said apparatus is characterized in that said external shaping means comprise a first corrugating unit and a second corrugating unit disposed facing each other, comprising a respective first and second plurality of corrugations defining a respective succession of ridges and throats of deformation, said first and second corrugating units being mutually mobile with respect to each other to advance said tubular elements in rolling during the shaping of said shaped portion, wherein at least one of said first and second plurality of corrugations is obtained on a surface which is at least partly disposed along said working path during the shaping of said shaped portion.

2. Apparatus as in claim 1, characterized in that said first and second corrugating units cooperate with each other during the shaping so that the ridges of said first corrugating unit are opposite and aligned with the ridges of said second corrugating unit to shape the throats of the shaped portion, while the throats of said first corrugating unit are opposite and aligned with the throats of said second corrugating unit to shape the ridges of the shaped portion.

3. Apparatus as in claim 1, characterized in that the internal shaping means of the shaping spindles comprise a corrugated portion having a profile formed by a succession of annular ridges and throats which are disposed offset to those of the first and second corrugating units respectively during the shaping of the shaped portion, so that the annular ridges of said internal shaping means are aligned with the throats of said external shaping means to form the ridges of the shaped portion, while the throats of said internal shaping means are aligned with the ridges of said external shaping means to form the throats of the shaped portion.

4. Apparatus as in claim 1, characterized in that said first and second corrugating units are disposed at a mutual distance, which is such as to define a passage channel configured to be crossed with interference by said tubular elements while being moved by said shaping spindles placed therein.

5. Apparatus as in claim 1, characterized in that said surface has a length, measured in a direction parallel to said working path, equal to at least ten times said distance measured between said first and said second corrugating unit.

6. Apparatus as in claim 1, characterized in that said second corrugating unit is mounted fixed.

7. Apparatus as in claim 1, characterized in that said second plurality of corrugations is obtained on said surface, which has a convex shape, faces said first corrugating unit and is shaped so that said second plurality of corrugations extends along a predefined arc of circumference.

8. Apparatus as in claim 1, characterized in that said first corrugating unit comprises a rotating member rotatable around a first axis of rotation fixed and parallel to the longitudinal axes of the shaping spindles.

9. Apparatus as in claim 8, characterized in that said movement means are configured to advance said plurality of shaping spindles along a circumference around a second axis of rotation disposed parallel and not coinciding with said first axis of rotation.

10. Apparatus as in claim 1, characterized in that the ridges and the throats of said first and second plurality of corrugations are obtained parallel to said working path.

11. Apparatus as in claim 1, characterized in that it further comprises compression means configured to compress said flexible shaped portion, just formed on said tubular elements, with a determinate compression force oriented according to a direction parallel to said longitudinal axis, thereby pressing said annular ridges and throats of said flexible shaped portion one on the other.

12. Apparatus as in claim 1, characterized in that the tubular elements are made of paper.

13. Method for making, starting from tubular elements, drinking straws with a shaped portion formed by a plurality of annular ridges alternating with annular throats made along a segment of predefined length, wherein said method comprises:

a step of continuously advancing, by means of movement means, a plurality of said tubular elements, a step of inserting, inside each of said tubular elements, a shaping spindle provided with a corrugated portion defining internal shaping means acting on an internal surface of each tubular element and extending along a respective longitudinal axis, a step of moving said shaping spindle inserted inside each of said tubular elements along a working path which develops substantially perpendicular to said longitudinal axis, a deformation step of said tubular elements wherein it is provided to shape said shaped portion by means of external shaping means, acting on an external surface of each tubular element, and cooperating with said internal shaping means, wherein said method is characterized in that said deformation step provides to advance said tubular elements in rolling by means of the relative movement between a first corrugating unit and a second corrugating unit comprised in said external shaping means, wherein said first corrugating unit and said second corrugating unit are disposed facing each other, and comprise a respective first and second plurality of corrugations, defining a respective succession of ridges and throats of deformation, and wherein at least one of said first and second plurality of corrugations is obtained on a surface which contacts said tubular elements during said advancing in rolling.

14. Method as in claim 13, characterized in that during said deformation step it is provided that said first and second corrugating units cooperate with each other so that the ridges of said first corrugating unit are opposite and aligned with the ridges of said second corrugating unit to form the throats of the shaped portion, while the throats of said first corrugating unit are opposite and aligned with the throats of said second corrugating unit to form the ridges of the shaped portion and that said insertion step provides to dispose said shaping spindle inside each of said tubular elements so that the annular ridges and throats forming said corrugated portion are disposed offset with those of the first and second corrugating units, respectively, so that the annular ridges of said corrugated portion are aligned with the throats of said external shaping means to form the ridges of the shaped portion, while the throats of said corrugated portion are aligned with the ridges of said external shaping means to form the throats of the shaped portion.

15. Method as in claim 13, characterized in that during said advance in rolling, said tubular elements are moved by said shaping spindles placed therein and cross with interference a passage channel having dimensions related to a distance measured between said first and said second corrugating units, wherein said surface optionally has a length, measured in a direction parallel to said working path, equal to at least ten times said distance.

16. Method as in claim 13, wherein said first corrugating unit comprises a rotating member rotating around a first axis of rotation fixed and parallel to said longitudinal axis, and characterized in that during said movement step it provides to advance said shaping spindle along a circumference, around a second axis of rotation disposed parallel and not coinciding with said first axis of rotation.

17. Method as in claim 13, characterized in that it further comprises a step of compressing said flexible shaped portion, just formed on said tubular elements, to compress said flexible shaped portion, with a determinate compression force, pressing the annular ridges and throats of said flexible shaped portion formed during said deformation step on each other, wherein said compression step occurs after a step of extracting said shaping spindle from the respective tubular element.

18. Method as in claim 13, characterized in that the tubular elements are made of paper.

* * * * *